United States Patent [19]

Kralovec

[11] Patent Number: 5,024,585

[45] Date of Patent: Jun. 18, 1991

[54] HOUSING COUPLING MECHANISM

[75] Inventor: William M. Kralovec, Delavan, Wis.

[73] Assignee: Sta-Rite Industries, Inc., Milwaukee, Wis.

[21] Appl. No.: 506,198

[22] Filed: Apr. 9, 1990

[51] Int. Cl.$^5$ .................. F04B 17/00; F16L 23/032
[52] U.S. Cl. .................................. 417/360; 285/368; 285/412
[58] Field of Search .................. 417/360, 423.15; 285/368, 412, 325

[56] References Cited

U.S. PATENT DOCUMENTS

| | | | |
|---|---|---|---|
| 198,508 | 12/1877 | Dowling. | |
| 253,988 | 2/1882 | DeNaeyer. | |
| 291,773 | 1/1884 | Reilly. | |
| 973,654 | 10/1910 | Hansen. | |
| 2,867,454 | 1/1959 | Pollia | 285/368 |
| 2,985,466 | 5/1961 | Solomon et al. | 285/368 |
| 2,996,318 | 8/1961 | Gravert | 285/358 |
| 3,165,341 | 1/1965 | Burns et al. | 285/406 |
| 3,311,392 | 3/1967 | Buschow | 285/173 |
| 3,797,949 | 3/1974 | Petros | 403/355 |
| 4,480,367 | 11/1984 | Johnson et al. | 29/157.1 R |
| 4,547,135 | 10/1985 | Noel et al. | 417/360 |
| 4,561,796 | 12/1985 | Hanaoka | 403/4 |

Primary Examiner—Leonard E. Smith
Assistant Examiner—M. Kocharou

[57] ABSTRACT

The improved housing coupling mechanism includes a first housing such as a motor housing having a first end in abutting relationship to a second housing such as a pump housing. The first housing includes a plurality of slots arranged about the housing perimeter and in a spaced relationship one to another and from the first end of the housing. The second housing includes a plurality of bosses, each boss being configured for coupling an attachment means thereto. Each attachment means includes a fastener (such as a bolt or threaded shaft) and an accompanying plate positionable to be in engagement with one of the slots in the first housing. Each fastener is positionally adjustable in a continuum, thereby providing a force to couple the first housing to the second housing. Coupling is accomplished when each attachment means is adjusted to provide a clamping force between its plate and the slot engaged by the plate. The improved mechanism simplifies and cost-reduces certain components and permits quick and easy assembly and disassembly of the housings.

15 Claims, 5 Drawing Sheets

HOUSING COUPLING MECHANISM

FIELD OF THE INVENTION

This invention is related generally to coupling mechanisms and, more particularly, to such a mechanism for coupling together component housings in an end-abutting relationship to one another. The inventive mechanism is particularly useful in coupling together pump and drive motor housings.

BACKGROUND OF THE INVENTION

Coupling mechanisms are commonly used to join pipe sections, motor housings or the like. Desirable characteristics and features of such mechanisms, often found lacking in prior work in this field, include low manufactured cost, mechanically secure coupling and ease of assembly and disassembly. Other desirable features include a minimal number of parts, a degree of "forgiveness" with respect to variations in certain manufacturing tolerances and the ability to couple structures of equal or disparate sizes.

One type of coupling mechanism is shown in U.S. Pat. No. 198,508 and includes a pipe section with an integral collar and a mating flange with a collar and a pair of rotatable turnbuckles mounted on the collar. When the flange and the mating pipe section are coupled together, the eccentric turnbuckle heads engage the pipe collar. A disadvantage of this arrangement is that the pipe section must have a collar affixed thereto and this adds to manufactured cost. Another, more serious disadvantage is that the eccentric heads can engage the pipe collar in only one position for each 360° rotation of the turnbuckle. Unless machining tolerances are very tightly controlled, the eccentric heads will only loosely engage the pipe collar. Even if such tolerances are exceptionally well controlled, there is no tolerance "forgiveness" as wear occurs on the heads and/or the collar engaged by them.

Another type of coupling mechanism is shown in U.S. Pat. No. 2,867,454. The pipe coupling shown therein is used to join two sections of pipe of equal diameter and equal wall thickness and uses a plurality of keys, each of which engages a notch in the pipe wall. While the coupling shown therein undoubtedly has great mechanical strength, it requires two hubs and two flanges (together with bolts and keys) to achieve secure coupling. Such multiplicity of parts adds to manufactured cost and complexity. In addition, the securing nuts and other component parts must be entirely removed in order to disassemble the coupling.

Yet another form of coupling mechanism is shown in U.S Pat. No. 3,797,949. The described device uses a bolted key and notch for securing a pin within a machine structure. While the mechanism shown therein does not clamp the illustrated parts together in abutting relationship (and in fact is incapable of doing so), it does secure them to prevent relative movement. In addition, the bolt must be entirely removed in order to fully separate the two parts.

Another known type of coupling assembly is found on certain types of motor-driven water pumps. In such units, the electric motor typically has a generally cylindrical housing with either a square or round "bell housing" or flared mounting flange of enlarged dimension. Bolts or other fasteners are used to couple this flange to a mating pad on the pump housing. The inclusion of the flange on the motor housing adds significantly to the housing cost. In addition, such units can be separated (for motor or pump servicing, for example), only by completely removing all of the bolts which couple the pump housing and the motor housing to one another.

A housing coupling mechanism which permits simplification of housing configuration, which permits quick disassembly of the coupled units without the necessity of complete bolt removal, which is "forgiving" of certain dimensional variations and which has a reduced manufactured cost would be an important advance in the art.

OBJECTS OF THE INVENTION

It is an object of this invention to overcome some of the problems and shortcomings of the prior art.

Another object of this invention is to provide an improved coupling mechanism which may be used to join structures of differing sizes.

Another object of this invention is to provide an improved mechanism for coupling together two generally cylindrical housings having the same or differing diameters.

Another object of this invention is to provide an improved mechanism which provides effective coupling, notwithstanding certain dimensional variations within the structures to be coupled.

Still another object of this invention is to provide an improved housing coupling mechanism which, in certain embodiments, permit the housings to be disassembled from one another without complete removal of the means which attaches them.

Still another object of this invention is to provide an improved coupling mechanism which may be used to join a thin walled housing to a second housing.

Yet another object of this invention is to provide an improved coupling mechanism which uses either perforate or imperforate slots in a housing to effect coupling.

These and other important objects will be apparent from the descriptions of this invention which follow.

SUMMARY OF THE INVENTION

In general, the improved housing coupling mechanism includes a first housing such as a motor housing having a first end in abutting relationship to a second housing such as a pump housing. The first housing includes a plurality of slots arranged about the housing perimeter and in a spaced relationship one to another. Each slot is also spaced from the first end of the housing. The second housing includes a plurality of bosses, each boss being configured for coupling an attachment means thereto.

Each attachment means includes a bolt or threaded shaft and an accompanying plate positionable to be in engagement with one of the slots in the first housing. Each attachment means is positionally adjustable in a continuum, thereby providing a force to couple the first housing to the second housing. Coupling is accomplished when each attachment means is adjusted to provide a clamping force between its plate and the slot engaged by the plate. Since each attachment means has a threaded bolt or shaft, it can be adjusted in a continuum. The housings may therefore be securely coupled to one another, even though the dimensions of the spaces between each slot and the end of the first housing may be slightly unequal, one to another.

In one embodiment, the second housing has a section which is generally cylindrical in shape and which has a diameter greater than that of the first housing. The bosses are formed on this circular section to define a bolt circle having a diameter somewhat greater than that of the first housing. With the bosses arranged in this way, the plates extend radially inward to engage their respective slots.

In another embodiment involving housings of differing diameters as described above, the bosses are formed on a bolt circle which has a diameter somewhat less than that of the first housing. In that instance, the plates extend radially outward to engage their respective slots. Since the bolts (or threaded shaft, a the case may be) are confined within the first housing, they may be tightened or loosened through an access port in the side of the first housing. In the alternative and if the first housing is open at its second, outer end, the bolts are adjusted using an extension socket wrench and by gaining access through the open end.

In yet another embodiment, the abutting portions of the first and second housings are of substantially equal diameter A plurality of bosses is formed on the exterior of one of the housings and attachment means are used to engage slots on the other housing.

A suitable plate for engaging each slot may be embodied as a common washer. When the diameter of the washer center hole and the width of the slot are appropriately selected, loosening the attachment means will permit the washer to be tipped to a degree sufficient to permit it to disengage its slot. Other plate embodiments include eccentric washers, elliptically shaped plates and clips with circular or elongate holes. Such embodiments permit the plate to be rotatably or slidably disengaged from the slot. Assembly and disassembly of the housings may thereby be effected without complete removal of the attachments means.

DETAILED DESCRIPTIONS OF PREFERRED EMBODIMENTS

The figures show an improved housing coupling mechanism 10 in accordance with the invention.

Figure 1:
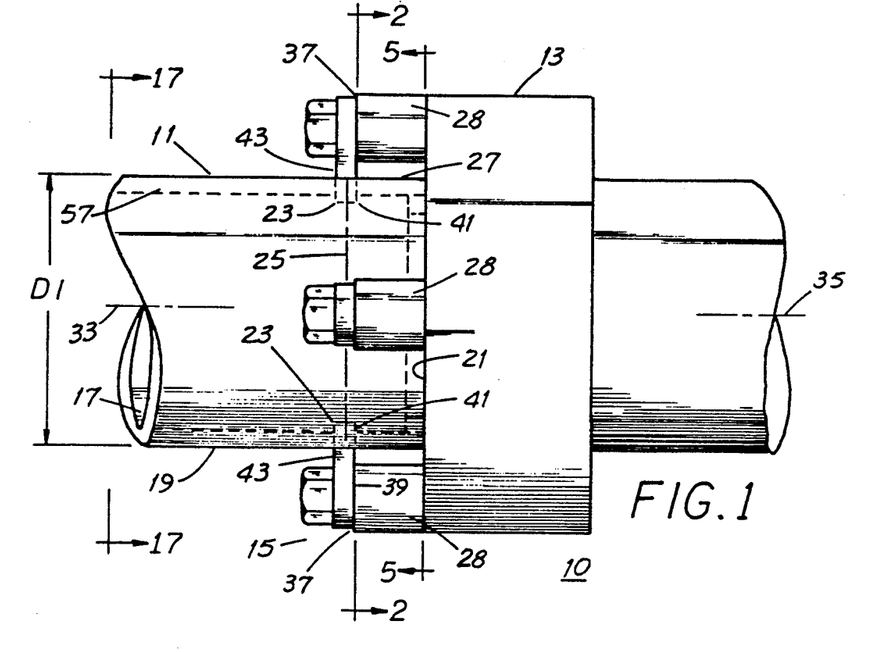
FIG. 1 is a side elevation view, with parts broken away and other parts shown in dotted outline, of the improved coupling mechanism.

Referring first to FIG. 1, the principal components of the coupling mechanism 10 include a first housing 11, a second housing 13 and attachment means 15. Merely by way of example, the first housing 11 may be part of an electric motor and the second housing 13 may be part of a fluid pump.

The first housing 11 has an interior surface 17, an exterior surface 19, a first, inward end 21 and a plurality of slots 23 arranged in a spaced relationship from one another about the housing perimeter 25. Each slot 23 is also spaced a distance from the first end 21.

As will become more apparent from the description below, a perimeter 25 may lie on the exterior surface 19 or on the interior surface 17. When the coupling mechanism 10 involves a first housing 11 which is cylindrical, either perimeter 25 will be circumferential and, of course, circular in shape.

Depending upon the manufacturing tolerances used to form and locate the slots 23, the width of each slot 23 and/or the spaces between slots may be slightly unequal one to another. Similarly, the spaces 27 between each slot 23 and the first end 21 may be slightly unequal one to another. One of the advantages of the improved coupling mechanism 10 is that secure housing coupling is easily achieved, notwithstanding such inequality.

Figure 2:
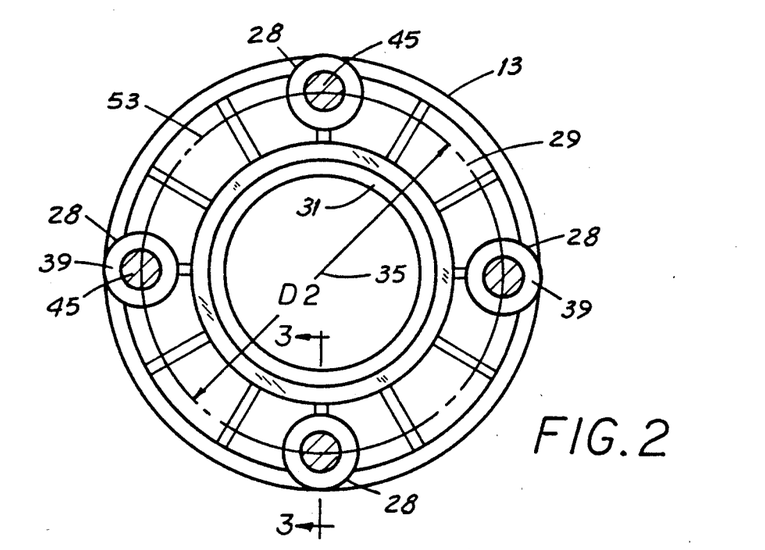
FIG. 2 is an elevation view of one embodiment of the second housing taken along the viewing plane 2—2 of FIG. 1 but with the first housing omitted.

Referring additionally to FIG. 2, the second housing 13 is attached to the first housing 11 in an abutting relationship to the first end 21. The second housing 13 has a plurality of bosses 28 and a face 29 in which a rabbet 31, a groove or other type of receptor or surface is formed. The precise type of such surface will be governed by the overall purpose of the structures to be coupled. Where the first housing 11 has an annular first end 21, a rabbet 31 is preferred. Irrespective of the particular type of receptor or surface selected, the plane defined thereby is generally normal to the longitudinal axes 33, 35 of the first housing 11 and the second housing 13, respectively. In addition, the diameter and web thickness of the rabbet 31 are selected to abut with and generally conform to those dimensions of the annular first end 21 of the housing 11.

Figure 3:
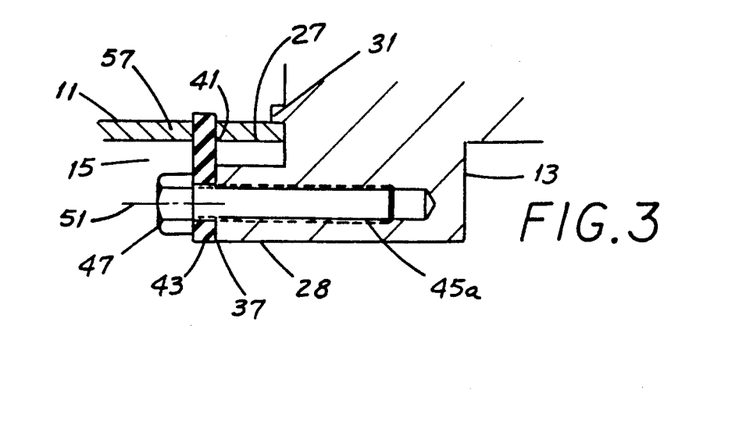
FIG. 3 is a cross sectional view of one embodiment of a fastener taken at the location of the viewing plane 3—3 of FIG. 3 but with respect to the structure of FIGURE 1, with parts broken away, other parts shown in cross section and still other parts shown in full representation.
Figure 4:
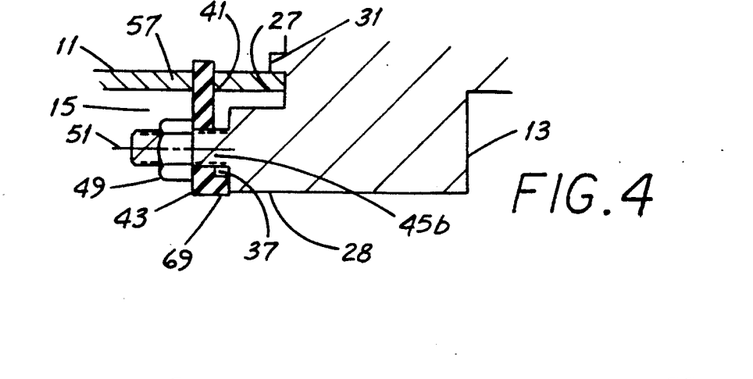
FIG. 4 is a cross sectional view of another embodiment of a fastener taken at the location of the viewing plane 3—3 of FIG. 3 but with respect to the structure of FIG. 1, with parts broken away, other parts shown in cross section and still other parts shown in full representation.

Referring additionally to FIGS. 3 and 4, each boss 28 resembles a cylindrical tube and in a highly preferred embodiment involving a second housing 13 which is molded or cast, the bosses 28 are formed as an integral part of the housing 13. Each boss 28 includes an end 37 which protrudes beyond the edge of the second housing 13 in the direction of the first housing 11. Each end 37 has a face 39 which defines a plane generally normal to the axes 33, 35.

In a highly preferred embodiment, all such faces 39 will lie generally in the same plane. Further, this plane is generally coincident with or slightly "underlapped" with respect to those edges 41 of the slots 23 which are closest to the first end 21. "Underlapped" in this instance means that such plane is slightly closer to the first end 21 than such edges 41. When so configured, each plate 43 can be drawn toward or tightly against its related face 39, i.e., in surface contact or near-surface contact with the face 39, to securely couple the housings 11, 13 together. This is the preferred approach for the embodiments described above and following.

Each boss 28 has a threaded portion 45 for coupling an attachment means 15 thereto. Each attachment means 15 includes an adjustable fastener 47 having a longitudinal axis 51. In one embodiment (FIG. 3), a female threaded portion 45a is formed in the boss 28 to receive the fastener 47 embodied as a bolt 47a. In another embodiment (FIG. 4), a male threaded portion 45b is molded into the boss 28 for receiving fastener 47 embodied as a nut 47b.

These are merely examples and yet other embodiments of fasteners 47 are well known. Irrespective of the precise embodiment of the fastener 47 used, it is important that its position be adjustable in a continuum along the longitudinal axis 51. With such adjustability, the mechanism 10 can couple housings 11, 13 securely together even though slots 23 may be slightly out of location or even though wear occurs.

Each attachment means 15 also includes a plate 43 positioned to engage its associated slot 23. Each plate 43 is received on its fastener 47 and when the fastener 47 is drawn up snugly, the resulting clamping force between a plate 43 and its associated slot 23 securely couples the housings 11, 13 to one another. The forces resulting from the tightening of each attachment means 15 act along vectors which are generally parallel to the longitudinal axes 33, 35 of the housings 11, 13 and spaced radially equidistant from such axes 33, 35. Therefore, forces tending to "cock" or misalign the housings 11, 13 with respect to one another are substantially eliminated so long as the fasteners 47 are tightened generally equally. Tightening of fasteners 47 is preferably to a specified torque so that each clamping force will generally be of a predetermined magnitude.

Figure 6:
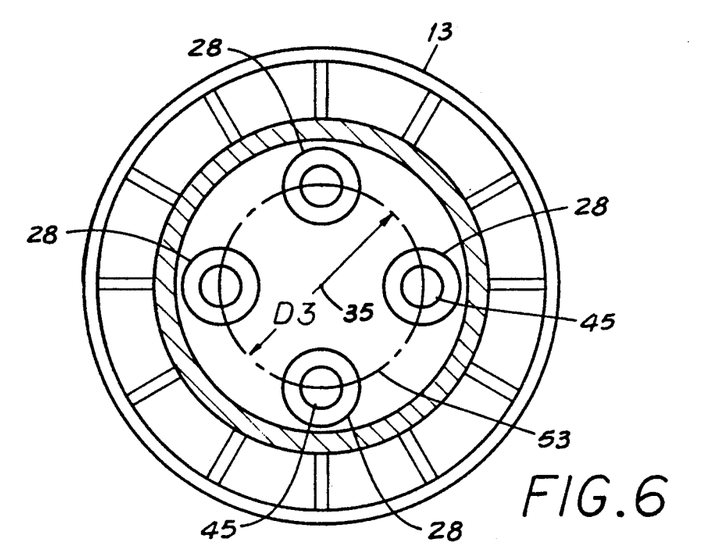
FIG. 6 is an elevation view of another embodiment of the second housing taken along the viewing plane 2—2 of FIG. 1.

As best seen in FIG. 2, the threaded portion 45 of each boss 28 is located on a circular path 53, often called a "bore circle." This bore circle 53 has a diameter D2 which is different from the diameter D1 of the first end 21 of the first housing 11. In one embodiment, the diameter D2 is sufficiently greater than the diameter D1 to permit the first end 21 to be spaced slightly from the inward surfaces of the bosses 28 when the mechanism is assembled. When so arranged, each adjustable fastener 47 is located exterior of the first housing 11 and the extended portion of each plate 43 projects radially inward to engage its associated slot 23. In another embodiment as shown in FIG. 6, the diameter D3 of the bore circle 53 is less than the diameter D1. With this arrangement, each adjustable fastener 47 is located inside the first housing 11 and the extended portion of each plate 43 projects radially outward to engage its associated slot 23.

Figure 5:
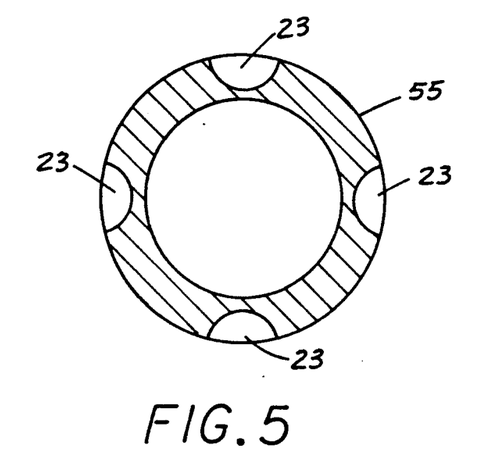
FIG. 5 is an elevation view of the first end of one embodiment of the first housing, taken along the viewing FIG. 1.
Figure 7:
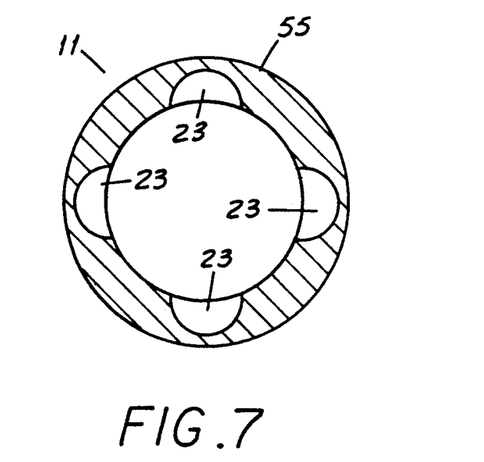
FIG. 7 is an elevation view of the first end of another embodiment of the first housing, taken along the FIG. 1.

In view of the foregoing fundamental principles of the coupling mechanism 10, it will be appreciated that a number of embodiments are possible while still adhering to such principles. As an example, the coupling mechanism may be used with a first housing 11 which has a relatively thick wall 55 or a relatively thin wall 57. In the former instance as shown in FIGS. 5 and 7, the slots 23 are formed to a depth in the wall 55; that is, the wall 55 is imperforate. In the latter instance as shown in FIG. 1, the slots 23 entirely perforate the wall 57. It is apparent that the housing 11 of FIG. 7 is intended for use with the housing 13 shown in FIG. 6 whereby the extended portions of the plates 43 extend radially outward to engage the slots 23.

Figure 8:
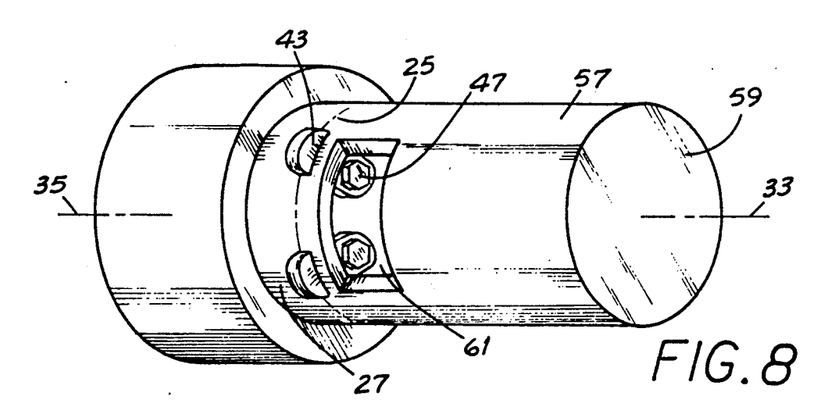
FIG. 8 is a side perspective view of the coupling mechanism showing how it may be accessed for adjustment through a port formed in the wall of the first housing.
Figure 9:
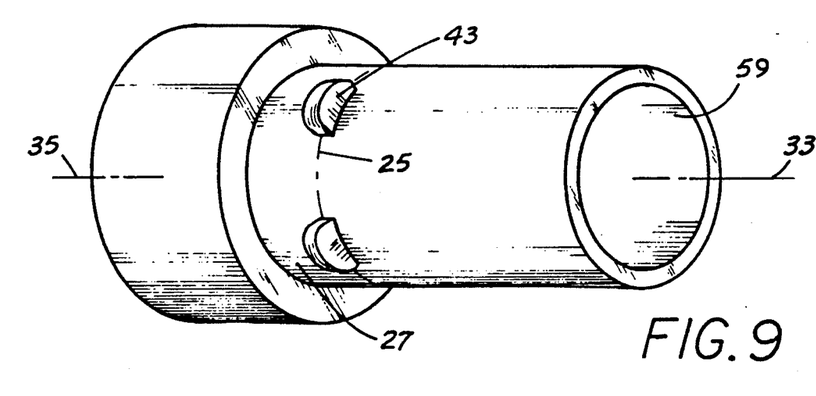
FIG. 9 is a side perspective view of the coupling mechanism showing how it may be accessed for adjustment through the open end of the first housing.

FIGS. 8 and 9 illustrate how the fasteners 47 may be adjusted in a situation where the bosses 28 are positioned inside the first housing as would occur when using the embodiment shown in FIG. 6. If the housing 11 is closed at its outer end 59 (FIG. 8), access may be obtained through a port 61 formed in its wall 57. On the other hand, if the outer end 59 of the housing 11 is open as shown in FIG. 9, access to the fasteners 47 may be by socket wrench or other tool extension through the rear opening.

All of the foregoing embodiments depict the coupling mechanism 10 wherein the second housing 13 has a section which is generally cylindrical in shape and has a diameter greater than the diameter D1 of the first end 21 of the housing 11. However, the versatility of the improved coupling mechanism 10 is further exemplified by the fact that it can be used to couple housings of substantially equal diameters.

Figure 10:
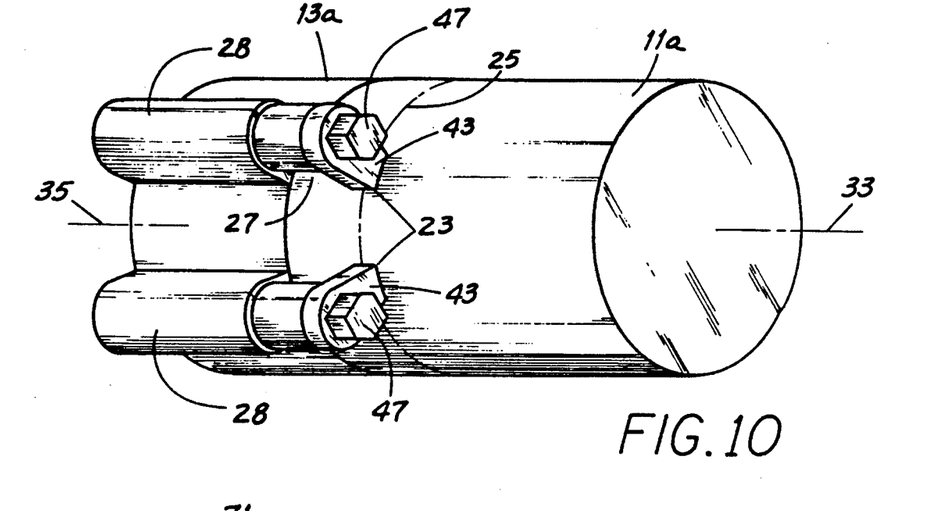
FIG. 10 is a side perspective view showing how the coupling mechanism is used to couple two housings of generally equal diameter.

Referring to FIG. 10, the first housing 11a and the second housing 13a have abutting sections of generally equal diameters. In this embodiment, the bosses 28 are located about the perimeter of one of the housings 11a or 13a, the second housing 13a in FIG. 10. As with embodiments described above, coupling is achieved by engaging each plate 43 with its associated slot 23 and snugly tightening the fastener 47.

Figure 11:
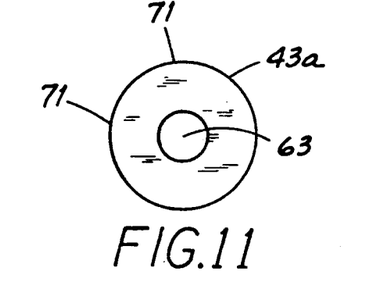
FIG. 11 is an elevation view showing an embodiment of the plate portion of the attachment means.

FIGS. 11-16 inclusive show several embodiments of plates 43 which may be used as part of the attachment means 15 for slot engagement. The plate of FIG. 11 is embodied as a washer 43a with a concentric center hole 63. Depending upon the thickness of the washer 43a, the diameter of the fastener 47 which receives the washer 43a and the width of the slot 23, loosening the attachment means 15 may permit tipping the washer 43a to an angle sufficient to disengage it from the slot 23.

Figure 12:
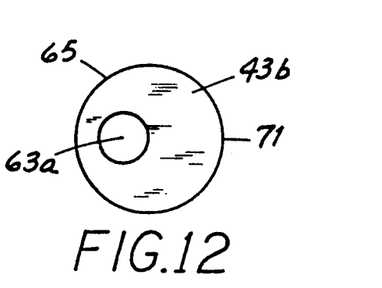
FIG. 12 is an elevation view showing another embodiment of the plate portion of the attachment means.
Figure 13:
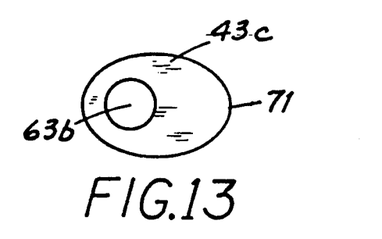
FIG. 13 is an elevation view showing another embodiment of the plate portion of the attachment means.
Figure 14:
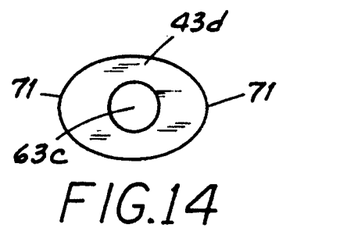
FIG. 14 is an elevation view showing another embodiment of the plate portion of the attachment means.

The washer 43b of FIG. 12 has an outer edge 65 which is generally circular and which has a round hole 63a eccentrically located therein. The plate 43c of FIG. 13 is generally elliptical and has a round hole 63b eccentrically formed therein while the plate 43d of FIG. 14 is likewise elliptical but has its round hole 63c located concentrically.

Figure 15:
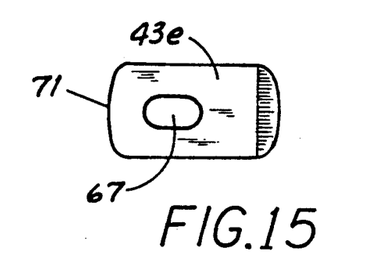
FIG. 15 is an elevation view showing another embodiment of the plate portion of the attachment means.
Figure 16:
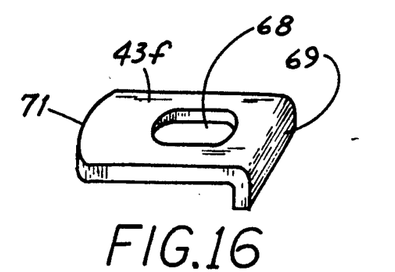
FIG. 16 is an elevation view showing another embodiment of the plate portion of the attachment means.

The plate 43e of FIG. 15 is generally rectangular in shape and has an elongated hole 67 formed therein. The plate 43f of FIG. 16 has an elongated hole 68, is generally L-shaped in edge view and includes a projecting shoulder 69. As illustrated in FIG. 4, this shoulder 69 bears against the top surface of the boss 28 and acts as a fulcrum. The plate 43f is particularly "forgiving" of slots 23 which are slightly out of location.

As mentioned briefly above, each of the plates 43 shown in FIGS. 11–16 include a portion 71 which is extended to engage its associated slot 23. The plate 43a of FIG. 11 is somewhat unique in that regard in that any part of the rim can function as an extended portion 71. Those plates 43 of FIGS. 12–16 are configured so that when the fastener 47 is loosened, the plate 43 can be rotated or otherwise positionally shifted to disengage a slot 23. The first housing 11 and the second housing 13 may thereby be easily disassembled by loosening, rather than removing, the fastener 47 and the plate 43.

From the foregoing, it is apparent that the improved housing coupling mechanism 10 employs a housing, the first housing 11 for example, which is devoid of mounting flanges, bell housings, mounting feet or the like. Such housing 11 (or at least that portion adjacent the second housing 13) may be embodied as a cylindrical tube. It is also to be appreciated that the improved coupling mechanism 10 is relatively "forgiving" as to the location of the slots 23. That is, slots 23 need only be closely approximately located in order to permit engagement by a plate 43 and secure coupling of the housings 11, 13. This has very favorable implications for manufacturing tooling and gaging.

Further, the number of bosses 28 is selected in view of the relative size and weight of the structures to be coupled. While such bosses 28 need not necessarily be spaced equidistant from one another, this is preferred.

Figure 17:
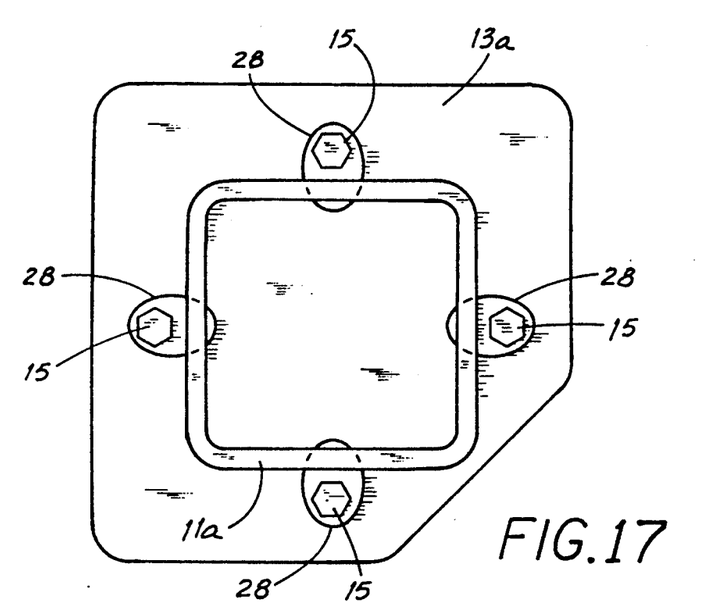
FIG. 17 is an elevation view taken along the viewing plane 17—17 of FIG. 1 except showing housings of differing configurations and how they are coupled together by the mechanism.

While cylindrical housings 11, 13 have been described above, the inventive coupling mechanism 10 is not limited to use on such housings. For example, FIG. 17 illustrates how the mechanism 10 may be used to couple housings 11a, 13a having rectangular or irregular shapes. Only brief comment is needed to point out that the first housing 11a (or at least that part adjacent the second housing 13a) is rectangular in cross-sectional shape. The second housing 13a is irregular in shape and the bosses 28 and attachment means 15 are positioned on the second housing 13a to generally accommodate the shape of the first housing 11a.

From the foregoing, it will be appreciated that the inventive housing coupling mechanism 10 has great utility in joining two structural members or housings 11, 13 in an abutting relationship. When the mechanism 10 is used to couple an electric motor to a pump, the motor housing (such as housing 11) may be greatly simplified (and cost-reduced) as compared to earlier configurations. If the second housing 13 is molded or cast, its configuration will be no more complex than earlier housings and perhaps less so.

While the principles of this invention have been described in connection with specific embodiments, it should be understood clearly that these descriptions are made only by way of example and are not intended to limit the scope of the invention.

What is claimed is:

1. An improved housing coupling mechanism including:
    a non-pressurized, thin walled first housing having a non-flared first end and a plurality of perforate slots arranged in a spaced relationship about the perimeter of the first housing, each slot being disposed in a spaced relationship from the first end;
    a second housing having a rabbet for aligning the first housing with respect to the second housing, such second housing being attached to the first housing in abutting contact to the first end, the second housing including a plurality of bosses integrally formed thereon, each boss being in overlapping relationship to the first end of the first housing, each boss being configured for coupling an attachment means thereto;
    a plurality of attachment means, each being coupled to a single boss and including a plate extending to engage a slot;
    each attachment means being positionally adjustable in a continuum for providing a force to couple the first housing to the second housing;
    the second housing and the first housing being securely coupled to one another when each attachment means is adjusted to provide a clamping force between its plate and the slot engaged thereby;
    the first housing being securely attached to and aligned on the second housing notwithstanding that the spaces between each slot and the first end of the first housing may be unequal to one another.

2. The coupling mechanism of claim 1 wherein at least the first housing has a section which is generally cylindrical in shape and has an interior surface and an exterior surface.

3. The coupling mechanism of claim 2 wherein the slots are formed on a perimeter which is located on the interior surface.

4. The coupling mechanism of claim 1 wherein at least the first housing has a section which is formed of a relatively thin-walled, generally cylindrical tubing and wherein the slots perforate the tubing.

5. An improved mechanism for coupling a pump housing and a motor housing to one another including:
    a generally cylindrical non-pressurized, thin walled first housing having a first, non-flared circular end and a circumferential path located in a spaced relationship from the first end;
    a plurality of elongate, perforate slots arranged generally along the circumferential path in a spaced relationship from one another;
    a second housing having a rabbet for aligning the first housing with respect to the second housing, such second housing being attached to the first housing in abutting contact to the first end, the second housing including a plurality of bosses, each boss being in overlapping relationship to the first end of the first housing, each boss having a threaded portion for coupling an attachment means thereto, each threaded portion being located on a circular path;
    a plurality of attachment means, each including an adjustable fastener having a longitudinal axis, each such fastener being in threaded engagement with a separate boss;
    a generally planar plate received on the fastener and having a portion extending generally normal to the longitudinal axis of the fastener, the extended portion of the plate being positioned to be in engagement with and extending through a slot;
    each fastener being positionally adjustable in a continuum for drawing its plate toward a boss, thereby providing a force to couple the first housing to the second housing;
    the second housing and the first housing being securely attached in an aligned abutting relationship to one another when each fastener is adjusted to exert a coupling force.

6. The coupling mechanism of claim 5 wherein the circular path on which each threaded portion is located has a path diameter, wherein the first end of the first housing has a diameter and wherein the diameter of the circular path is different from the diameter of the first end.

7. The coupling mechanism of claim 6 wherein the diameter of the circular path is greater than the diameter of the first end, wherein each fastener is located exterior the first housing and wherein the extending portion of each plate extends inward to engage a slot.

8. The coupling mechanism of claim 6 wherein the diameter of the circular path is less than the diameter of the first end, wherein each fastener is generally located within the first housing and wherein the extending portion of each plate extends outward to engage a slot.

9. The coupling mechanism of claim 7 wherein the second housing has a section which is generally cylindrical in shape and wherein the first, circular end of the first housing is generally concentric with the cylindrical section of the second housing when the first housing and the second housing are coupled to one another.

10. The coupling mechanism of claim 8 wherein the second housing has a section which is generally cylindrical in shape and wherein the first, circular end of the first housing is generally concentric with the cylindrical section of the second housing when the first housing and the second housing are coupled to one another.

11. An improved housing coupling mechanism for coupling a motor housing and a pump housing to one another including:
  a non-pressurized, motor housing having a first, circular end and a plurality of elongate, perforate slots arranged about the perimeter of the motor housing, each slot being disposed in a spaced relationship from the first end, the perimeter of the motor housing defining a circle, the diameter of such circle and the diameter of the first end being substantially equal to one another;
  a pump housing attached to the motor housing in abutting contact to the first end, the pump housing having a rabbet for aligning the motor housing with respect to the pump housing, such pump housing further having a section which is generally cylindrical in shape and which has a diameter greater than that of the circular end of the motor housing, the pump housing further having a plurality of bosses, each such boss being in overlapping relationship with the first end of the motor housing, each boss further having a circular threaded portion for coupling an attachment means thereto, the circle centers of the threaded portions being coincident with a circular path;
  an attachment means associated with each slot, each attachment means including a threaded fastener and a plate in engagement with a slot, each fastener being positionally adjustable in a continuum;
  each plate urging the motor housing and the pump housing toward coupled engagement with one another upon rotation of the fastener;
the second housing and the first housing being securely coupled in an aligned abutting relationship to one another when such fastener is rotatably adjusted to exert a coupling force.

12. The coupling mechanism of claim 11 wherein the circular path on which the circle center of each threaded portion is located has a path diameter, wherein the first end of the motor housing has a diameter and wherein the diameter of the circular path is different from the diameter of the first end.

13. The coupling mechanism of claim 11 wherein the diameter of the circular path is greater than the diameter of the first end, wherein each fastener is located exterior the motor housing and wherein the plate extends inward to engage a slot.

14. The coupling mechanism of claim 12 wherein the diameter of the circular path is greater than the diameter of the first end, wherein each fastener is located exterior the motor housing and wherein the plate extends inward to engage a slot.

15. The coupling mechanism of claim 12 wherein the diameter of the circular path is less than the diameter of the first end, wherein each fastener is generally located within the motor housing and wherein the plate extends outward to engage a slot.

* * * * *

UNITED STATES PATENT AND TRADEMARK OFFICE
CERTIFICATE OF CORRECTION

PATENT NO. : 5,024,585

DATED : June 18, 1991

INVENTOR(S) : William M. Kralovec

It is certified that error appears in the above-identified patent and that said Letters Patent is hereby corrected as shown below:

In column 3, line 59, after "ing" insert --plane 5-5--.

In column 3, line 64, after the word "the" (2nd occurrence) insert --viewing plane 5-5 of--.

Signed and Sealed this

Sixth Day of October, 1992

Attest:

DOUGLAS B. COMER

*Attesting Officer*     *Acting Commissioner of Patents and Trademarks*